United States Patent

[11] 3,549,106

| [72] | Inventor | Daniel J. Stark<br>Rochester, N.Y. |
|---|---|---|
| [21] | Appl. No. | 823,262 |
| [22] | Filed | May 9, 1969 |
| [45] | Patented | Dec. 22, 1970 |
| [73] | Assignee | Eastman Kodak Company<br>Rochester, N.Y.<br>a corporation of New Jersey |

[54] PROJECTOR TAKE-UP MECHANISM
6 Claims, 6 Drawing Figs.

[52] U.S. Cl. .................................................. 242/210,
242/71.1, 242/74, 242/197
[51] Int. Cl. .......................................................... B65h 75/02;
G11b 15/66, G11b 73/10
[50] Field of Search ............................................. 242/197,
198, 210, 192, 195, 201, 71.1, 71.2; 352/157, 158,
72, 74, 78

[56] References Cited
UNITED STATES PATENTS

| 3,282,521 | 11/1966 | Schuller ...................... | 242/210 |
| 3,414,206 | 12/1968 | Ramig, Jr. ..................... | 242/210X |

OTHER REFERENCES

Gersch, German Appl. No. 1,187,914, Pub. Feb. 25, 1965, 352/157

*Primary Examiner*—George F. Mautz
*Attorney*—Robert W. Hampton and G. Herman Childress ABSTRACT: Fingers for contacting film in a film takeup mechanism for a motion picture projector are shaped and mounted to minimize frictional contact between the fingers, reel flanges between which the fingers are positioned, and a film strip on the reel.

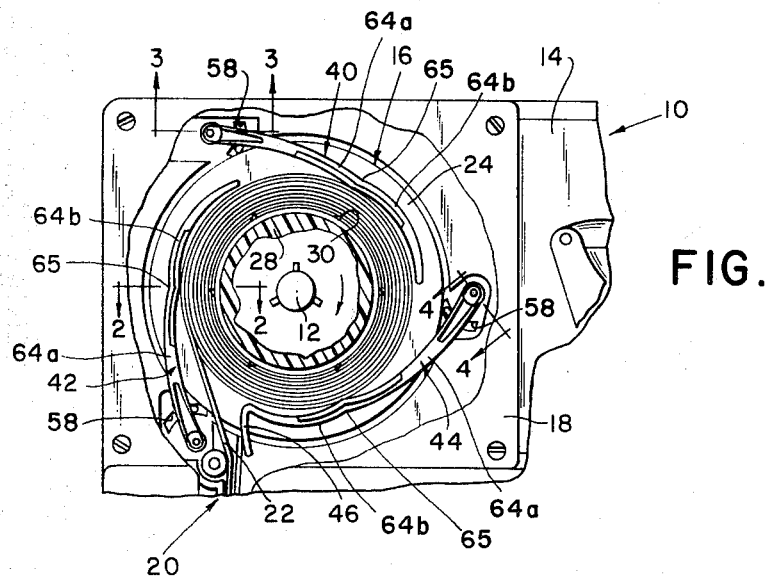

DANIEL J. STARK
INVENTOR.

3,549,106

PROJECTOR TAKE-UP MECHANISM

BACKGROUND OF THE INVENTION

1. Field of the Invention

This invention relates to takeup mechanisms or devices for machines, such as motion picture projectors, which are adapted to handle elongate strips of web material and wherein fingers are positioned between flanges of a takeup reel for engaging the strip material and directing the material toward a hub of the reel.

2. Description of the Prior Art

It is known to use fingers positioned between reel flanges for engaging a strip of film or the like and directing the film toward the reel hub to effect automatic takeup of the film on the reel. However, the known prior art devices are not constructed or mounted for minimizing frictional contact between the fingers and the reel flanges. This is a particular problem when the reels used (such as plastic reels) become warped during manufacture of the reels so that the inner surfaces of the reel flanges do not have the desired flat shape.

SUMMARY OF THE INVENTION

Accordingly, it is an object of this invention to provide a finger for a takeup system of the type described wherein frictional contact of the finger with reel flanges and film wound on the reel is minimized. In the disclosed embodiment of the invention this is accomplished by providing a configuration of the takeup finger and by mounting such finger so as to permit pivotal movement of such finger toward and away from a reel hub and also lateral or sidewise movement between the reel flanges.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a fragmentary view, partially in elevation and partially in section, of the takeup portion of a motion picture projector or other machine for handling an elongate strip of web material;

FIGS. 2—4 are enlarged fragmentary cross sections taken along lines 2-2, 3-3 and 4-4, respectively of FIG. 1;

DESCRIPTION OF THE PREFERRED EMBODIMENT

Figure 5:
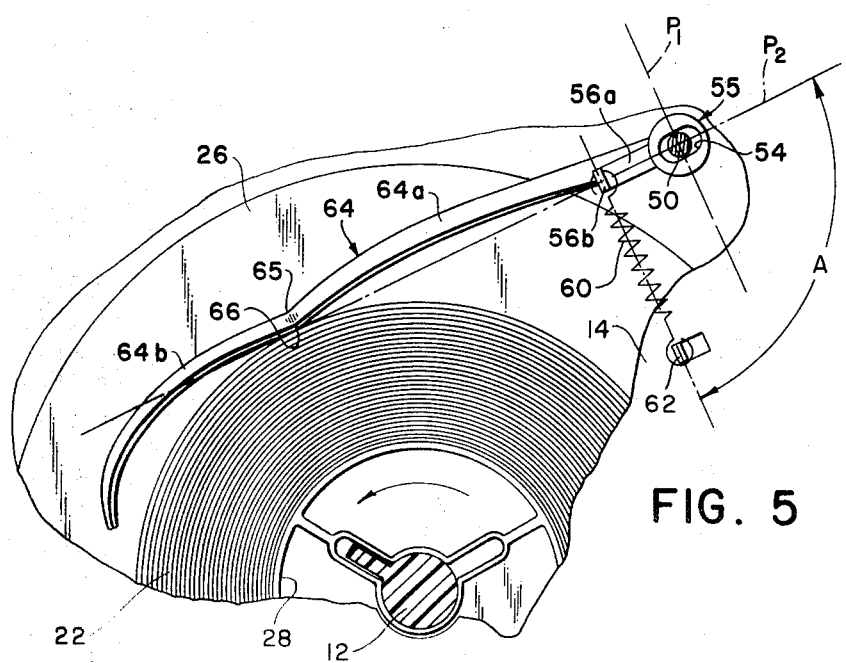
FIG. 5 is an enlarged view taken from inside the machine and illustrating one of the takeup fingers shown in FIG. 1.

Because motion picture projectors having takeup mechanisms are well known, the present description will be directed in particular to elements forming part of, or cooperating more directly with the present invention, projector elements not specifically shown or described herein being understood to be selectable from those known in the art.

The present invention is particularly useful in connection with a machine or mechanism, such as a motion picture projector generally designated 10, having a takeup spindle 12 which projects through a wall 14 of the projector. Spindle 12 is adapted to rotatably support a takeup reel shown generally at 16 which, in accordance with the present invention, may be substantially fully enclosed within a suitable housing 18 carried by wall 14. Projector 10 preferably includes a threading mechanism or device partially shown at 20. In operation, a length of film 22 is delivered from the threading device into the space between flanges 24 and 26 of reel 16 and wound onto the hub 28 thereof. The reel hub may be provided with suitable projections 30 which are adapted to enter spaced perforations or sprocket holes 32 along one side edge portion of film 22 for attaching the film to hub 28. The portion of film 22 between sprocket holes 32 and the opposite side edge of the film contains the usual series of image frames 34.

The takeup mechanism illustrated comprises three separate fingers 40, 42 and 44 which are substantially identical to each other with the exception of an end portion 46 on finger 44 which is adapted to cooperate with threading mechanism 20 for guiding the leading end of film 22 into an enclosed chamber formed by housing 18 and wall 14 so that the film is directed between reel hub 28 and finger 42. Fingers 40, 42 and 44 are normally biased toward hub 28 so that when the film enters the enclosed takeup chamber and the space between the reel flanges, the film is directed into engagement with finger 42 which urges the end of the film toward hub 28 where projections 30 on the hub may enter sprocket perforations 32 for attaching the film to the reel. For a more complete explanation of the structure and operation of the apparatus described hereinbefore reference is made to the beforementioned copending patent applications.

In accordance with the present invention each of the fingers is supported from wall 14 by one of three generally cylindrical pivots 50 which are secured to and project from the wall 14. Each pivot may be secured to the wall by a rivet 52 (FIGS. 3 and 4) or other suitable means so that the pivot is rigid with respect to the wall 14. Each finger has an elongate opening 54 in a finger mounting portion 55 which receives one of the pivots for mounting the fingers for pivotal movement about an axis passing through the pivot. The fingers are held on the pivots by suitable retainers 53 which are loose enough to allow the limited lateral movement of the fingers described later.

Each finger includes a lever 56 which has a first portion 56a that extends along the outer surface of wall 14, and a second portion 56b which projects through an arcuate slot 58 in wall 14. As shown in FIG. 5, a light tension spring 60 is attached to the inner end of a lever portion 56b and to a post 62 on the inner surface of wall 14 for biasing the finger toward reel hub 28 and into engagement with the film.

Each finger also has an elongate film contact member 64 which comprises two arcuate portions 64a and 64b which intersect in an area of the finger designated 65. As shown in FIG. 2, the inner surface 66 of contact member 64 in area 65 tapers from one side to the other side so that when the film is attached to the reel the fingers each contact the film only along the side edge portion therefor containing the sprocket holes 32. In other words, when the film is attached to the reel there is no contact between the fingers and the film except by surface 66, and then the contact is limited to that portion of the film containing the sprocket holes, thereby avoiding any scratching of the image frames 34.

Figure 6:
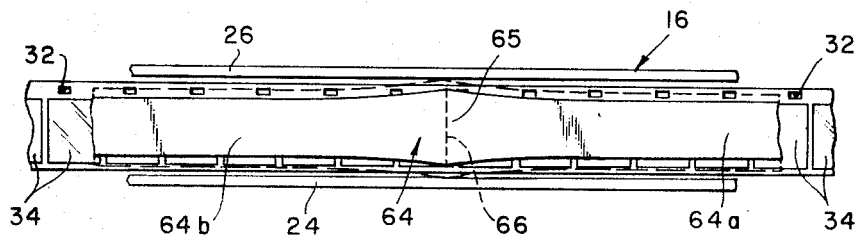
FIG. 6 is an enlarged plan view of a portion of the mechanism shown in FIG. 5.

As shown in FIG. 6, the portion 65 of each finger which lies between arcuate portions 64a and 64b is the widest portion of each finger, and it is dimensioned with respect to the spacing between reel flanges 24 and 26 so that it is narrower than the distance between the reel flanges, thereby permitting some lateral or sidewise movement of each finger between the reel flanges. However, the relation between the width of the fingers and the spacing between the reel flanges, together with the taper of surface 66 of each finger is such that there is no contact between the fingers and the picture or the image area of the film irrespective of the lateral position of the fingers with respect to the reel flanges. This limited lateral movement is desirable since it allows each finger to move away from each reel flange in response to frictional contact with the reel flanges. Unless such lateral movement is permitted the finger may rub against one or the other of the reel flanges, thereby increasing the frictional forces on the machine. This rubbing frictional contact is particularly common when reel flanges are used which are distorted from the optimum flat, planar shape during manufacture of reels. Also, because area 65 of each finger is wider than finger portions 64a and 64b, there is only line contact between the fingers and the reel flanges, thus minimizing friction resulting from this contact. The fingers are each mounted in a manner which will now be described to provide for this desirable lateral movement of the fingers.

Referring now to FIGS. 3—5, the opening 54 in each finger is shaped with respect to the generally cylindrical configuration of the pivot 50 so that along a first plane P1 the wall of opening 54 closely abuts the outer surface of pin 50, thereby substantially preventing movement of the finger with respect to the pivot within the plane P1. On the other hand, along a second plane P2 the size of the opening 54 varies from a first end portion of the opening (shown at the top in FIG. 3) wherein the opening is substantially circular in cross section and only slightly larger than the pivot 50 to a second end portion (shown at the bottom in FIG. 3) wherein opening 54 is substantially larger than the diameter of pivot 50 and wherein the opening is substantially elliptical in shape as shown in FIG. 5. Plane P2 is substantially perpendicular to the reel flanges and to plane P1. The mounting of the fingers in accordance with this invention permits the desirable limited lateral movement of each of the fingers between the reel flanges as described hereinbefore. As previously noted, the retainer 53 on one end of the pivots loosely hold the fingers on the pivots so that they do not prevent the desired limited movement of the fingers in plane P2.

Preferably, the force of spring 60 is exerted in a direction which minimizes any tendency for the spring to cause lateral movement of finger 64. Thus, as is shown in FIG. 5, the angle A defined by the biasing force of spring 60 and plane P2 (or a line extending through the axis of pivot 50 and through portion 65 of the finger) should be approximately 90°. With the particular mounting of the spring and finger illustrated in the drawings, the angle A is 90° when the film reel contains approximately ½ of the maximum amount of film that can be wound onto the takeup reel. However, spring 60 can be mounted so that the angle A is substantially equal to 90° when the reel contains any desired film thickness or length.

As will be apparent from the foregoing description, film which enters the enclosed takeup chamber engages finger 42 and is directed by that finger toward the hub of the reel. In the event finger 42 fails to cinch the film end to the reel hub, then fingers 40 and 44 will also engage the film and continue to direct it toward the reel hub. During rotation of the reel the fingers 40, 42 and 44 are freely movable in plane P2 between the reel flanges due to the cooperation between the pivot 50 and opening 54 so that frictional contact between the flanges and reel flanges is minimized. As shown in FIG. 2, the configuration of portion 66 of each finger is such that the fingers do not contact the picture area 34 even when the fingers contact reel flange 24. This minimum contact between the fingers, the reel flanges and the film is such that there is little resistance or friction between the various elements even when the film is being removed from the takeup reel and rewound onto a supply reel.

The invention has been described in detail with particular reference to preferred embodiments thereof, but it will be understood that variations and modifications can be effected within the spirit and scope of the invention.

I claim:

1. In a takeup mechanism for use with a device for advancing a length of strip material, the mechanism having at least one elongate member adapted to engage the strip material and direct the material toward a hub for winding the material on the hub, said mechanism comprising:
    a pivot supported by the device; and
    said member having an opening therein for receiving said pivot, thereby mounting said member for arcuate movement about an axis passing through the pivot, said opening in said member being shaped and dimensioned with respect to the shape and dimensions of said pivot (a) to allow movement of said member in a first plane substantially perpendicular to said axis and (b) to substantially prevent movement of said member in a second plane spaced from said first plane and substantially perpendicular to said axis.

2. In a takeup mechanism as set forth in claim 1 further comprising means for exerting a biasing force against said member to urge said member about said axis, said exerting means being connected to said member so that the biasing force is exerted in a direction substantially perpendicular to said first plane when said member is in at least one arcuate position with respect to said pivot.

3. A takeup mechanism for use with a takeup reel of a motion picture projector or the like wherein the projector is adapted to deliver a length of film into a space between flanges of the takeup reel for winding of the film on a hub of the reel, the improvement comprising:
    at least one elongate guide finger for engaging the film and directing the film toward the hub of the takeup reel;
    a pivot carried by said projector and positioned adjacent the takeup reel;
    said finger having an opening therein for receiving said pivot to mount said finger for movement toward and away from the reel hub between the reel flanges and about an axis passing through the pivot, the pivot and the opening in said finger being in close fitting relation along a first plane passing through said pivot in a direction parallel to said axis, and said pivot and said opening in said finger having a loose fitting relation in a second plane passing through said pivot in a direction parallel to said axis and substantially perpendicular to said first plane whereby said finger is movable with respect to said pivot within said second plane.

4. A takeup mechanism as set forth in claim 3 wherein said opening in said finger is substantially elliptical in shape at one end portion of the opening with the length of said opening extending along said second plane.

5. A takeup mechanism as set forth in claim 3 wherein said finger has a surface facing the reel hub for engagement with film delivered to the reel by the projector, said surface being shaped to limit contact between said surface and the film to one side edge portion of the film.

6. In a takeup mechanism for use with a takeup reel of a motion picture projector adapted to advance a length of film into a space between two flanges of a takeup reel for winding of the film onto a hub of the reel, the mechanism having at least one elongate finger adapted to engage the film material and guide the film toward the reel hub, said mechanism comprising:
    a pivot carried by the projector and positioned adjacent to one of the reel flanges; and
    said finger having an opening therein transverse to the length of the finger for receiving said pivot to mount said finger for movement about the pivot so that a portion of the finger is movable between the reel flanges toward and away from the hub, said opening in said finger being shaped and dimensioned with respect to the shape and dimensions of said pivot to allow such movement of said finger toward and away from the reel hub and also to allow lateral movement of the finger between the reel flanges.